United States Patent
Subasic et al.

(10) Patent No.: US 7,613,433 B2
(45) Date of Patent: Nov. 3, 2009

(54) REDUCING LOCAL OSCILLATION LEAKAGE IN A RADIO FREQUENCY TRANSMITTER

(75) Inventors: Bojan Subasic, Etobicoke (CA); Mathew A. Rybicki, Austin, TX (US)

(73) Assignee: VIXS Systems, Inc., Toronto, Ontario (CA)

( * ) Notice: Subject to any disclaimer, the term of this patent is extended or adjusted under 35 U.S.C. 154(b) by 914 days.

(21) Appl. No.: 10/741,714

(22) Filed: Dec. 19, 2003

(65) Prior Publication Data

US 2005/0136860 A1    Jun. 23, 2005

(51) Int. Cl.
*H04B 1/04* (2006.01)
(52) U.S. Cl. .................. 455/114.2; 455/118; 455/127.1; 375/296
(58) Field of Classification Search ................ 455/63.1, 455/67.11, 67.13, 114.2, 115.1, 118, 127.1, 455/127.2, 127.3; 375/296, 297
See application file for complete search history.

(56) References Cited

U.S. PATENT DOCUMENTS

| | | | | |
|---|---|---|---|---|
| 4,882,767 A | * | 11/1989 | Machida et al. | 455/115.1 |
| 5,001,773 A | * | 3/1991 | White | 455/118 |
| 5,307,512 A | * | 4/1994 | Mitzlaff | 455/127.3 |
| 5,313,658 A | * | 5/1994 | Nakamura | 455/127.2 |
| 6,154,640 A | * | 11/2000 | Itoh et al. | 455/118 |
| 6,154,641 A | * | 11/2000 | Zhang | 455/114.2 |
| 6,397,044 B1 | * | 5/2002 | Nash et al. | 455/118 |
| 6,614,854 B1 | * | 9/2003 | Chow et al. | 375/297 |
| 6,917,803 B2 | * | 7/2005 | Hata | 455/67.13 |

* cited by examiner

*Primary Examiner*—Quochien B Vuong
(74) *Attorney, Agent, or Firm*—Garlick Harrison & Markison; Bruce E. Stuckman

(57) ABSTRACT

A method for reducing LO leakage in a radio frequency transmitter begins by producing analog outbound signals from digital outbound signals that represent transmit data. The processing continues by amplifying the analog outbound signals to produce amplified analog outbound signals. The process then continues by mixing the amplified analog outbound signals with a local oscillation to produce mixed signals having an LO leakage component. The processing then continues by attenuating the mixed signals having the LO leakage component to produce mixed signals having reduced LO leakage.

13 Claims, 3 Drawing Sheets

RF transmitter 10

REDUCING LOCAL OSCILLATION LEAKAGE IN A RADIO FREQUENCY TRANSMITTER

BACKGROUND OF THE INVENTION

1. Technical Field of the Invention

This invention relates generally to wireless communication systems and more particularly to radio frequency transmitters used within such systems.

2. Description of Related Art

FIG. 1 is a schematic block diagram of a known super heterodyne radio frequency transmitter architecture. As shown, the transmitter includes a digital baseband (BB) processor, a digital-to-analog converter (DAC), a $1^{st}$ intermediate frequency mixer, a surface acoustic wave (SAW) filter, a $2^{nd}$ intermediate frequency mixer, a bandpass filter, a power amplifier (not shown) and an antenna. In operation, the digital baseband processor converts data into digital baseband signals in accordance with a particular encoding protocol as may be prescribed in various standards such as IEEE 802.11, Bluetooth, global system for mobile communications (GSM), et cetera. The digital-to-analog converter converts the baseband digital signal into an analog digital signal. A frequency domain representation of the baseband signal, which includes a plurality of channels, is shown centered at DC.

The $1^{st}$ intermediate frequency mixer mixes the baseband signal with a 790 MHz local oscillation. As one of average skill in the art will appreciate, the mixer stage may include two mixers for mixing an in-phase component and quadrature component. The resulting intermediate frequency is shown to include a plurality of channels several of which are undesired and one of which is desired. In addition, as a result of the mixing via the $1^{st}$ mixing stage a local oscillation (LO) leakage is produced and shown at the intermediate frequency (IF). The LO leakage results due to mismatches in the components of the in-phase and quadrature mixers of the first IF mixer as well as mismatches between the in-phase intermediate frequency and quadrature intermediate local oscillation.

The SAW filter removes the undesired channels leaving the desired channel. As shown, the desired channel still includes the local oscillation leakage. The next intermediate frequency stage mixes the desired channel of the IF signal with a $2^{nd}$ local oscillation (e.g., 4.4 gigahertz) to produce a radio frequency signal. The radio frequency signal, which may have a 5.21 gigahertz frequency, is shown to include the local oscillation leakage centered at RF.

As is known, when an RF signal that includes an LO leakage component is received by a receiver, the LO leakage cannot be filtered out and thus adversely effects the recapturing of data. In some instances, the magnitude of the LO leakage with respect to the magnitude of the signal is such that data cannot be accurately extracted from the RF signal.

Therefore, a need exists for a method and apparatus to reduce LO leakage in a radio frequency transmitter.

BRIEF SUMMARY OF THE INVENTION

The reduced LO leakage of a radio frequency transmitter of the present invention substantially meets these needs and others. In one embodiment, a method for reducing LO leakage in a radio frequency transmitter begins by producing analog outbound signals from digital outbound signals that represent transmit data. The processing continues by amplifying the analog outbound signals to produce amplified analog outbound signals. The process then continues by mixing the amplified analog outbound signals with a local oscillation to produce mixed signals having an LO leakage component. The processing then continues by attenuating the mixed signals having the LO leakage component to produce mixed signals having reduced LO leakage. As such, by amplifying the signals prior to mixing and then subsequently attenuating, the signal level of the signal is at the desired level while the signal strength of the LO leakage is reduced.

In another embodiment, a radio frequency transmitter includes a digital-to-analog converter, a gain module, a mixing stage and an attenuation module. The digital-to-analog converter is operably coupled to convert baseband digital signals into baseband analog signals. The gain module is operably coupled to amplify the baseband analog signals to produce amplified baseband signals. The mixing stage is operably coupled to mix the amplified baseband signals with a local oscillation to produce mixed signals that include an LO leakage component. The attenuation module is operably coupled to attenuate the mixed signals to produce outbound mixed signals, wherein the outbound mixed signals have an attenuated LO leakage component. As such, by amplifying the signals prior to mixing and then subsequently attenuating the mixed signals, the signal strength of the signal is at a desired level while the signal strength of the LO leakage component is reduced.

DETAILED DESCRIPTION OF THE INVENTION

Figure 1:
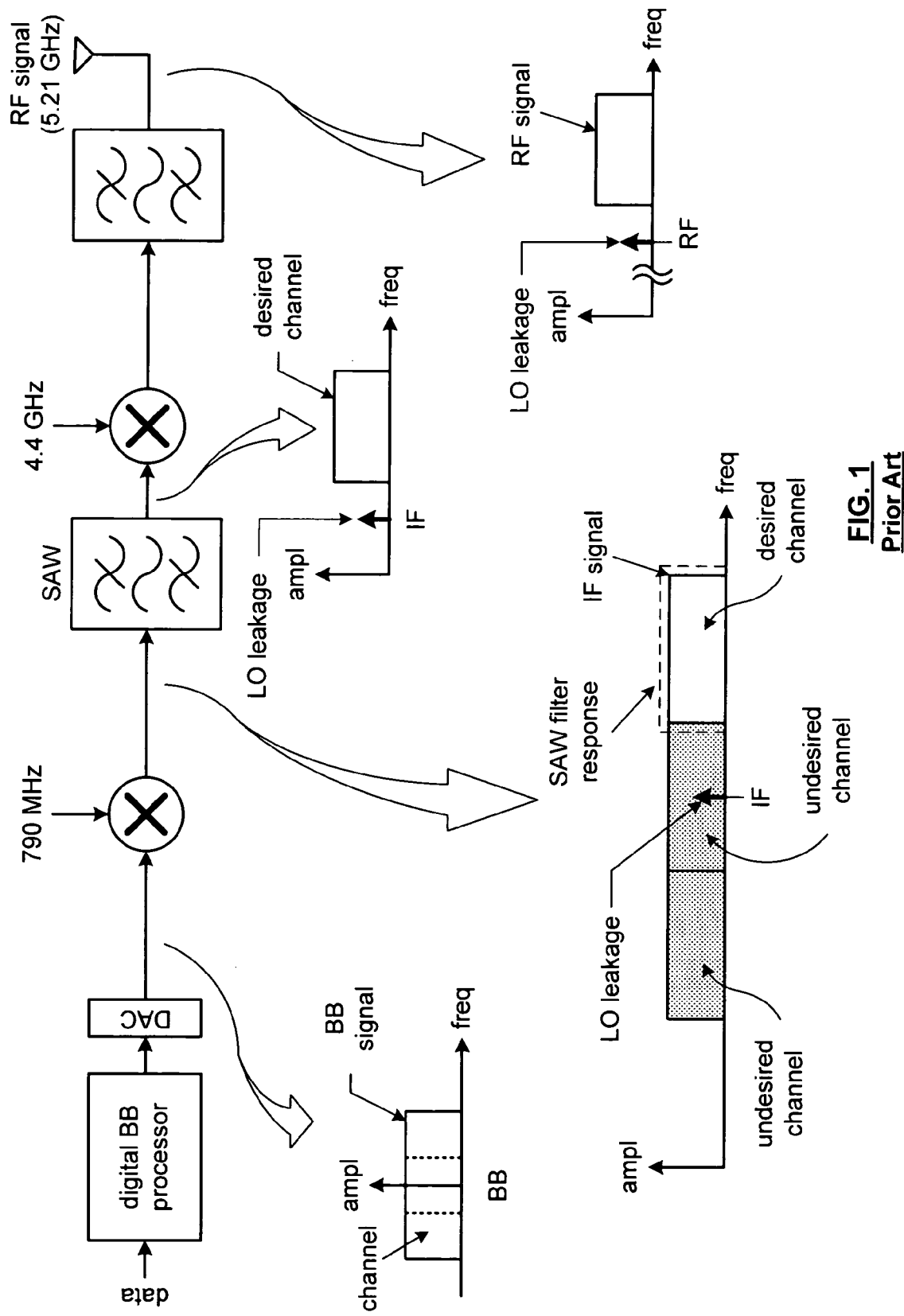
FIG. 1 is a schematic block diagram of a prior art radio frequency transmitter.
Figure 2:
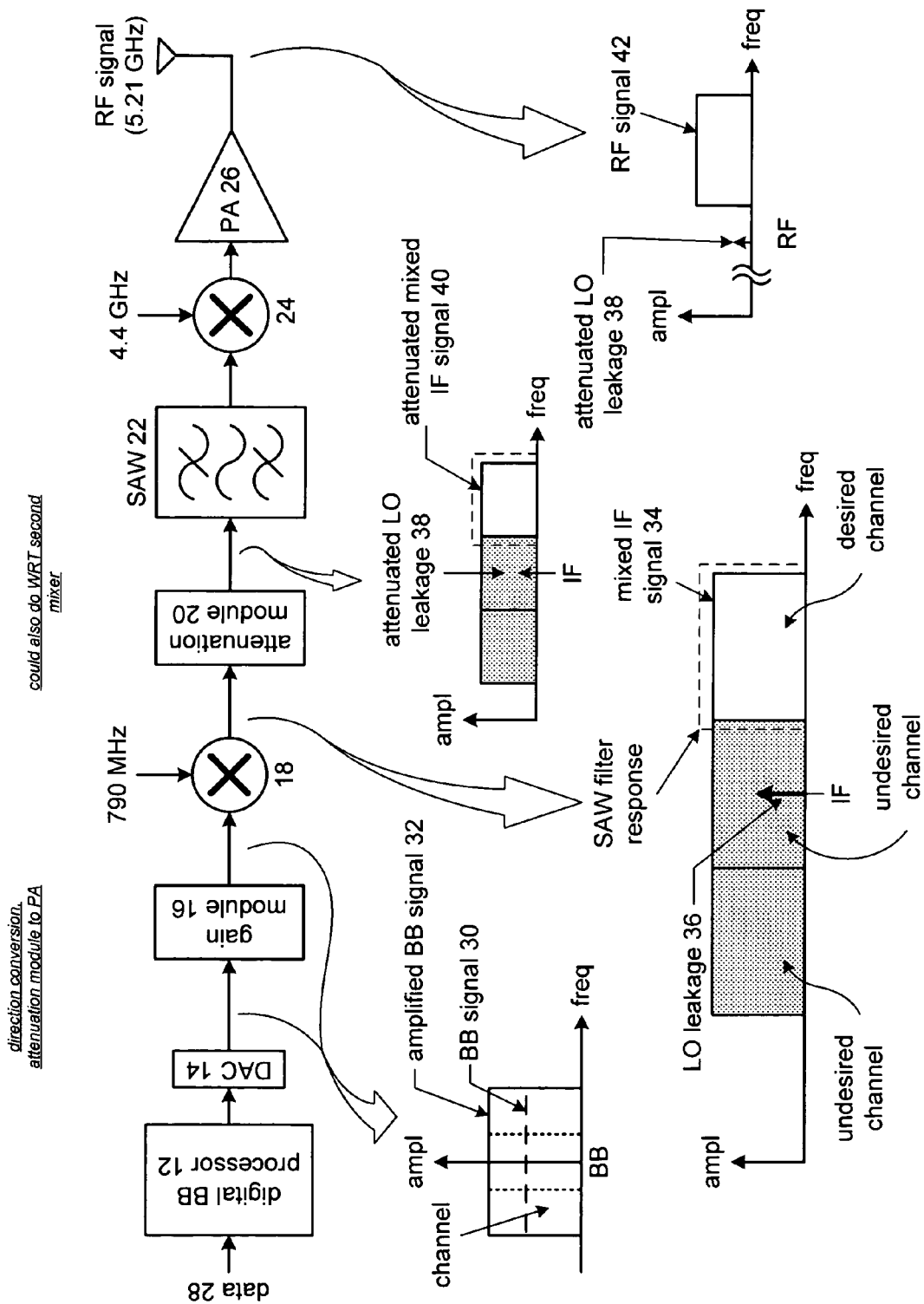
FIG. 2 is a schematic block diagram of a radio frequency transmitter in accordance with the present invention.

FIG. 2 is a schematic block diagram of a radio frequency (RF) transmitter 10 that includes a digital baseband processor 12, a digital-to-analog converter 14, a gain module 16, a $1^{st}$ mixing stage 18, an attenuation module 20, a surface acoustic wave (SAW) filter 22, a $2^{nd}$ mixing stage 24, and a power amplifier 26. The digital baseband processor 12 is operably coupled to encode data 28 based on an encoding protocol as prescribed by one or more standards being supported by the RF transmitter 10. Such standards include, but are not limited to, IEEE 802.11a, IEEE 802.11b, IEEE 802.11g, Bluetooth, et cetera. The encoding includes, but is not limited to, forward error correction, interleaving, mapping, et cetera. The resulting digital baseband signal is then converted to an analog baseband signal via the digital-to-analog converter 14. Note that, as shown, the analog baseband signal 30 is a complex signal (i.e., includes an in-phase component and a quadrature component), which requires the digital-to-analog converter 14 to include an in-phase DAC and a quadrature DAC.

As shown in the accompanying frequency domain representation of baseband signal 30, it has a particular magnitude (which is represented by the dashed line) and includes a plurality of channels that are centered about baseband (i.e., zero frequency). The gain module 16 amplifies the baseband signal 30 to produce an amplified baseband signal 32. The corresponding representation of the amplified baseband signal 32 is also illustrated having a magnitude (which is represented by the solid line) that is greater than the magnitude of the baseband signal 30. The amount of gain provided by gain module 16 may be a minimum of 2 dB and range in excess of 20 dB.

The $1^{st}$ mixing stage 18 mixes the amplified baseband signal 32 with a $1^{st}$ local oscillation (e.g., a 790 MHz local oscillation). A frequency domain representation of the resulting mixed IF signal 34 is illustrated to include a plurality of channels centered at an intermediate frequency. The plurality of channels includes one desired channel and a plurality of undesired channels. The SAW filter 22 has a response that substantially passes the desired channel while substantially attenuating the undesired channels. As is further illustrated in the frequency domain representation of mixed IF signal 34, the mixed IF signal 34 includes an LO leakage component 36.

The attenuation module 20 attenuates the mixed IF signal 34, including the LO leakage component 36, to produce an attenuated mixed IF signal 40. As shown, the magnitude of the LO leakage is attenuated to produce an attenuated LO leakage 30. The amount of attenuation of the attenuation module 20 may be in the range of 2 dB to greater than 20 dB. In one embodiment, the gain of the gain module 16 substantially matches the attenuation of the attenuation module 20 such that the magnitude of the attenuated mixed IF signal 40 substantially matches the magnitude of the baseband signal 30, yet the magnitude of the LO leakage component 36 is attenuated.

The SAW filter 22 filters the attenuated mixed IF signal 40 to substantially pass the desired channel and filter out the undesired channels. The resulting signal is then mixed via the $2^{nd}$ mixing stage 24 with a $2^{nd}$ local oscillation (e.g., 4.4 gigahertz) to produce a radio frequency signal.

The power amplifier 26 amplifies the radio frequency signal 42 and transmits it via an antenna. The resulting frequency of the RF signal may be 5.21 gigahertz. A frequency domain representation of RF signal 42 is shown to include the RF signal 42 centered about the RF frequency and to include the attenuated local oscillation leakage component 38. By amplifying the signal prior to mixing and then attenuating the mixed signal, the signal strength of the signal remains at a desired level while the signal strength of the LO leakage is reduced. By reducing the LO leakage, received RF signals have an enhanced capability of accurate recapturing of the encoded data contained therein.

Figure 3:
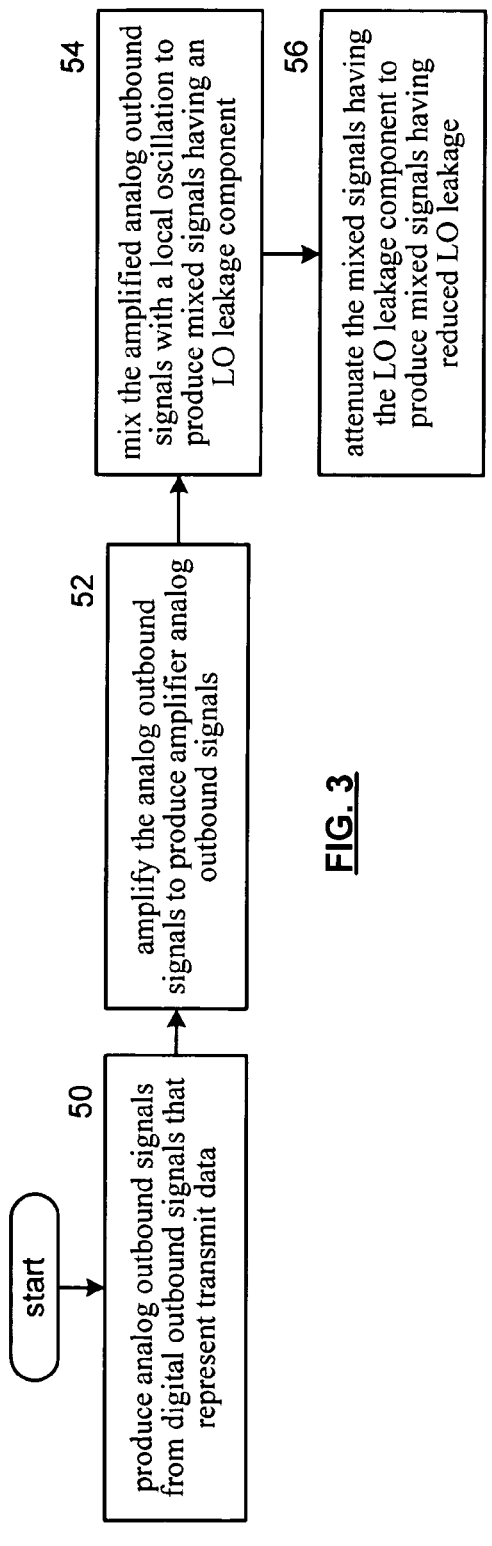
FIG. 3 is a logic diagram of a method for reducing local oscillation leakage in a radio frequency transmitter in accordance with the present invention.

FIG. 3 is a logic diagram of a method for reducing local oscillation leakage in a radio frequency transmitter. The process begins at Step 50 where analog outbound signals are produced from digital outbound signals, wherein the digital outbound signals represent transmit data. The process then proceeds to Step 52 where the analog outbound signals are amplified to produce amplified analog outbound signals. The process then proceeds to Step 54 where the amplified analog outbound signals are mixed with a local oscillation to produce mixed signals having a local oscillation component. The process then proceeds to Step 56 where the mixed signals with the LO leakage component is attenuated to produce mixed signals having a reduced LO leakage component. Note that in one embodiment, the magnitude of the amplifying is inversely proportional to the magnitude of the attenuation. In another embodiment, the local oscillation frequency substantially equals the frequency of the outbound radio frequency signals such that the transmitter is a direct conversion transmitter. In yet another embodiment, the local oscillation may correspond to a $1^{st}$ local oscillation wherein the mixed signals having the reduced local oscillation are again mixed through a $2^{nd}$ mixer to produce RF signals. Accordingly, the method of FIG. 3 is equally applicable to super heterodyne architecture radio frequency transmitters.

Figure 4:
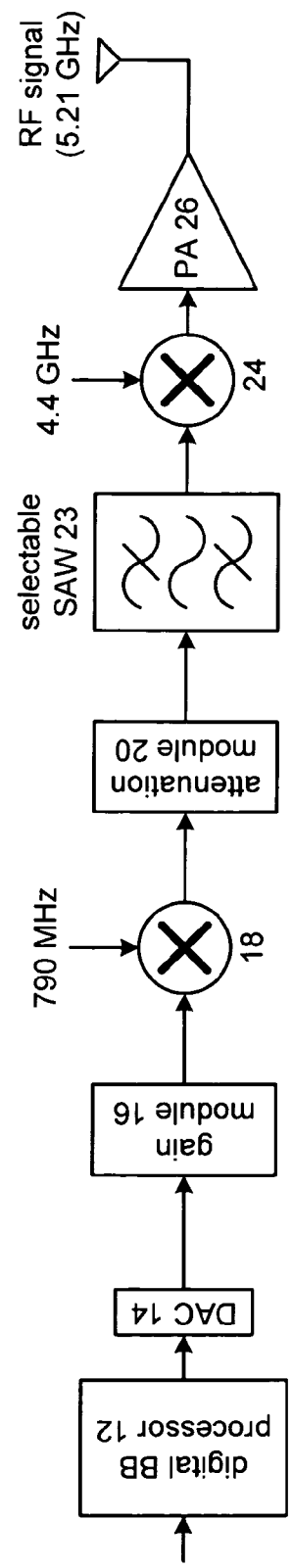
FIG. 4 is a schematic block diagram of another radio frequency transmitter in accordance with the present invention.

FIG. 4 is a schematic block diagram of another radio frequency transmitter that is identical to the transmitter of FIG. 2 except the SAW 22 of FIG. 2 is replaced with a selectable SAW filter 23 in the embodiment of FIG. 4. The selectable SAW filter 23 may be implemented as disclosed in co-pending patent application entitled RF TRANSMITTER AND RECEIVER FRONT-END, having the same filing date as the present patent application, which is incorporated herein by reference.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for reducing local oscillation leakage in a radio frequency transmitter. As one of average skill in the art will appreciate, other embodiments may be derived from the teaching of the present invention without deviating from the scope of the claims.

What is claimed is:

1. A method for reducing local oscillation (LO) leakage in a radio frequency (RF) transmitter, the method comprises:
producing analog outbound signals from digital outbound signals that represent transmit data;
amplifying the analog outbound signals by an amplifier gain to produce amplifier analog outbound signals;
mixing the amplified analog outbound signals with a local oscillation to produce mixed signals having an LO leakage component; and
attenuating the mixed signals having the LO leakage component by an amount that is based on the amplifier gain, to produce mixed signals having reduced LO leakage.

2. The method of claim 1, wherein the amplifier gain is inversely proportional to the amount of the attenuating the mixed signals.

3. The method of claim 1 further comprises:
amplifying the mixed signals to produce outbound radio frequency (RF) signals, wherein frequency of the local oscillation substantially equals frequency of the outbound RF signals.

4. The method of claim 1 further comprises:
filtering the mixed signals to produce filtered mixed signals;

mixing the filtered mixed signals with a second local oscillation to produce radio frequency (RF) signals; and amplifying the RF signals to produce outbound RF signals.

5. An apparatus for reducing local oscillation (LO) leakage in a radio frequency (RF) transmitter, the apparatus comprises:

processing module; and memory operably coupled to the processing module, wherein the memory stores operational instructions that cause the processing module to:

produce analog outbound signals from digital outbound signals that represent transmit data;

amplify the analog outbound signals by an amplifier gain to produce amplifier analog outbound signals;

mix the amplified analog outbound signals with a local oscillation to produce mixed signals having an LO leakage component; and attenuate the mixed signals having the LO leakage component by an amount that is based on the amplifier gain, to produce mixed signals having reduced LO leakage.

6. The apparatus of claim 5, wherein the amplifier gain is inversely proportional to the amount of the attenuating the mixed signals.

7. The apparatus of claim 5, wherein the memory further comprises operational instructions that cause the processing module to:

amplify the mixed signals to produce outbound radio frequency (RF) signals, wherein frequency of the local oscillation substantially equals frequency of the outbound RF signals.

8. The apparatus of claim 5, wherein the memory further comprises operational instructions that cause the processing module to:

filter the mixed signals to produce filtered mixed signals;

mix the filtered mixed signals with a second local oscillation to produce radio frequency (RF) signals; and amplify the RF signals to produce outbound RF signals.

9. A radio frequency (RF) transmitter having reduce local oscillation (LO) leakage, wherein the RF transmitter comprises:

a digital to analog converter operably coupled to convert baseband digital signals into baseband analog signals;

a gain module operably coupled to amplify the baseband analog signals by an amplifier gain to produce amplified baseband signals;

mixing stage operably coupled to mix the amplified baseband signals with a local oscillation to produce mixed signals, wherein the mixed signals include an LO leakage component; and an attenuation module operably coupled to attenuate the mixed signals by an attentuation that is based on the amplifier gain, to produce outbound mixed signals, wherein the outbound mixed signals have an attenuated LO leakage component.

10. The RF transmitter of claim 9, wherein the amplifier gain substantially equals the attenuation of the attenuation module.

11. The RF transmitter of claim 9 further comprises: a power amplifier operably coupled to amplify the outbound mixed signals to produce outbound radio frequency (RF) signals, wherein frequency of the local oscillation substantially equals frequency of the outbound RF signals.

12. The RF transmitter of claim 9 further comprises:

a surface acoustic wave (SAW) filter operably coupled to filter the outbound mixed signals to produce filtered mixed signals;

second mixer stage operably coupled to mix the filtered mixed signals with a second local oscillation to produce radio frequency signals; and power amplifier operably coupled to amplify the radio frequency signals to produce outbound radio frequency signals.

13. The RF transmitter of claim 12, wherein the SAW filter comprises: a plurality of SAW filters, wherein one of the plurality of SAW filters is selected to filter the outbound mixed signals.

* * * * *